Patented Jan. 12, 1954

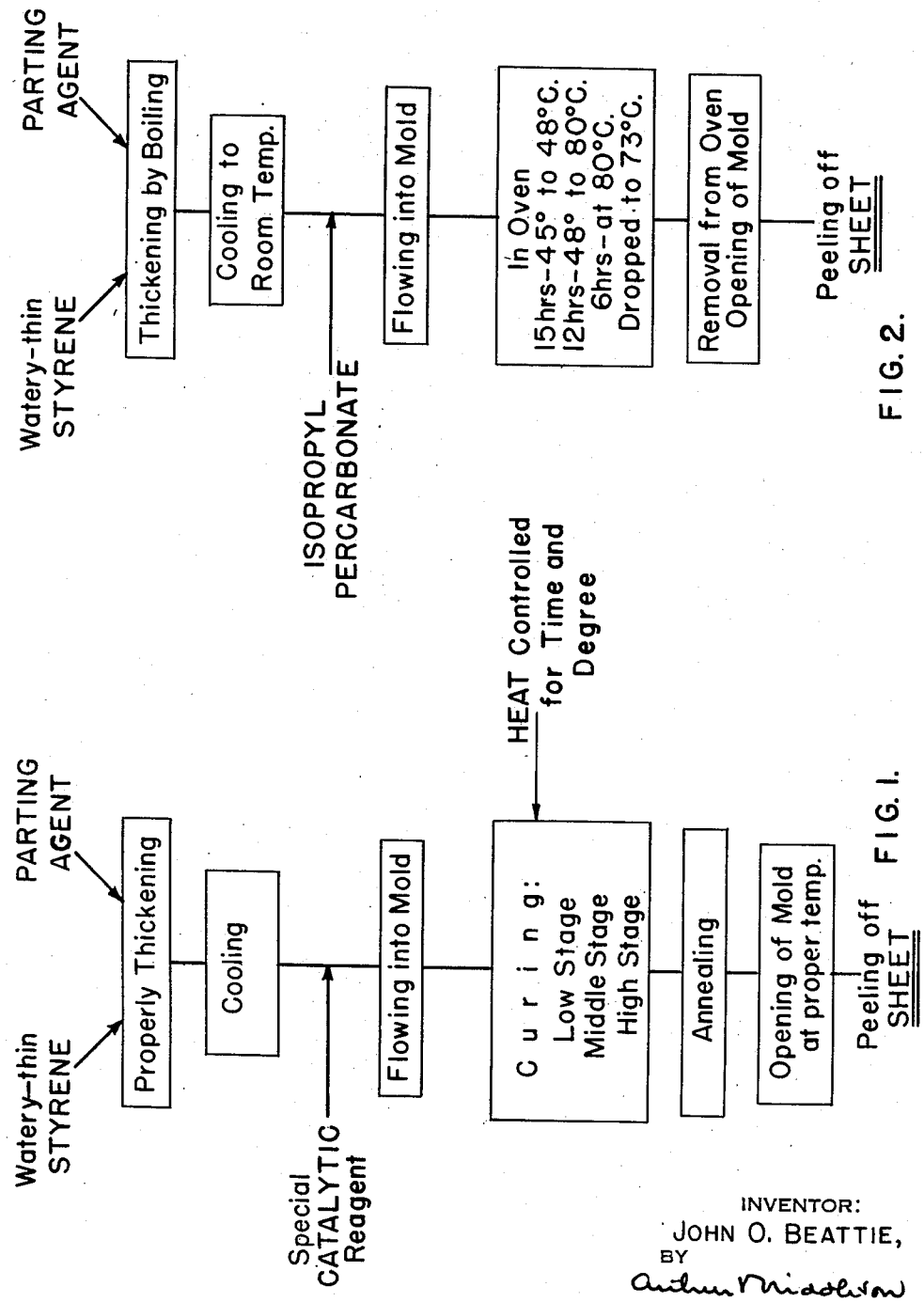

2,665,452

UNITED STATES PATENT OFFICE 2,665,452

METHOD OF PRODUCING TRANSPARENT POLYSTYRENE SHEETS

John O. Beattie, Stamford, Conn., assignor to Cast Optics Corporation, Riverside, Conn., a corporation of New York Application August 1, 1951, Serial No. 239,792

3 Claims. (Cl. 18—58)

This invention relates to the formation of sheets of a polymerized monomer. More particularly the invention relates to making such sheets in optically clear condition. An object of this invention is to devise ways and means for making such sheets of polystyrene which is a rather inexpensive starting material. Previous attempts to accomplish this object have encountered difficulties in that such sheets have not been satisfactory optically; they have had voids or bubbles in them; they have been too brittle; they have been cloudy or hazy; they have not been water-white, but yellow; and they have had crazing on their surface. So it is another object of this invention to produce sheets of polymerized styrene completely free of these disadvantages. And another object is to discover how to exercise close control of the polymerization of the styrene at all times in order to avoid the occurrence of these characteristics, each and all of which degrade the resulting sheet if not rendering it generally non-usable. The discovery of how to exercise and realize this control has been difficult of attainment because there seems to be so little previously known of just what happens during the polymerization of styrene and of the mechanisms thereof. So another object is to find out what happens and how to control it. Yet another object is to make use of the styrene in its cheapest and most abundant form as now marketed.

Styrene is a vinyl benzene resin and never gels in the pure form as now marketed. It has only one active radical in its molecule and consequently polymerizes to form linear chains instead of a three-dimensional network. As it never gels, it must be treated differently from all those monomers that become gelated during polymerization. It merely progressively increases its viscosity or consistency during polymerization and its mold-curing temperatures are such that this thickening takes place while the styrene is in liquid-phase or at least the viscous-phase so the mold is not to be opened until a substantially solid-phase degree of cure has been reached, which may be followed by an annealing stage. Undoubtedly, the void- or bubble-formation, the formation of haze, and the tendency to craze are related to the conditions under which this thickening type of polymerization takes place, so it is another object of this invention to find out just what these conditions are and then avoid such tendencies to produce these degrading results. Most of these tendencies seem to be exerted while the styrene is being cured within the mold, so it is another object of this invention to find out how to thicken the styrene as much as economically possible before it is put into the mold.

Another object was to try to find a catalytic reagent that is usable with the styrene during its polymerization that not only would facilitate the latter, but by the use of which there could be controlled a predetermined higher average molecular weight of the polystyrene to produce a sheet thereof with the desired toughness—as opposed to brittleness produced by lower molecular weights. Lower molecular weight are produced to some extent by higher curing temperatures, so it is another object to cure the styrene at the lowest economical polymerizing temperatures. Foreign particles, such as dust, tend to produce bubbles and crazing which degrade the appearance of the sheet, so it is a further object to minimize their presence as far as possible.

These objects are attainable by the practice of a process that may be described generally as starting with a watery-thin styrene to which a parting agent has been added; properly thickening it; mixing with the thickened styrene a special catalytic reagent; inserting the mixture into a dustless and lintless mold formed of two glass plates clamped together with an accurately dimensioned gasket between the glass plates adjacent their edges; inserting in an oven such glass mold containing the styrene mixture and subjecting the mold to heating carefully controlled as to time and to degree so that the mold is subjected to a low heat stage, a middle heat stage, and a high heat stage, followed by an annealing stage; whereupon the mold is opened, and the formed sheet of polystyrene peeled from one of the glass plates.

In the drawings:

Figure 1 is a diagrammatic showing of the process; and

Figure 2 is another diagrammatic showing of the process including details of the several steps.

In greater particularity, the parting agent is stearic acid used in quantity of 1% by weight of the watery styrene. The proper thickening is done by boiling the mixture at 146° C. for about ten minutes under conditions that any resulting vapors are quickly condensed and the depth of the watery styrene boiled is shallow enough to permit rapid dissemination of the evolved heat. This thickening results in a contraction of the mass by about 3.4%. Thereafter, the thickened mass is cooled to room temperature and then is mixed with from ⅛ to ¼ per cent of isopropyl percarbonate, and inserted into the mold of glass plates. The sandwich of two such plates with the fluid thickened styrene mixture is then put in an oven. In the oven, the sandwich is subjected to a low heat stage at a temperature between 45° C. and 48° C. for fifteen hours. Next comes the middle heat stage at a temperature starting at 48° C. and rising to 80° C. over a period of 12 hours. And the high temperature stage maintains 80° C. for about 6 hours. Thereafter comes the annealing stage during which the temperature is dropped and maintained at 73° C. for at least half an hour during which the cured polymerized styrene sheet passes from viscous liquid-phase to solid-phase, or substantially so. While the mold is at 73° C. or within not more than 2° C. thereunder, the mold is placed horizontally and is opened by wedging one plate of glass from the other and removed, leaving the sheet of polystyrene exposed, whereupon that sheet is peeled from the other plate of glass that is supporting it, and then stacked after preferably spray-coating it with a protective flexible coating such as polyvinyl alcohol, or low tack masking paper, for producing a peelable protecting coating on both sides of the polystyrene sheet. The sheet continues to cool and to shrink, but the shrinkage takes place uniformly and freely.

The catalytic reagent is unique in that it functions at the relatively low temperatures used, and unlike benzoyl peroxide it gives no yellow cast especially to the edge of the sheet, or any hazy or cloudy areas. Benzoyl peroxide requires a temperature of cure around 25° C. higher than isopropyl percarbonate. Isopropyl percarbonate seems to act as a chemical reagent as well as a catalyst because it becomes all used up, incorporating itself into the polymer chain, and cannot be identified in the final product. That is why it is referred to herein as a catalytic reagent. Moreover, it offers a definite control of the physical characteristics of the polystyrene sheet, namely, whether it is brittle or tough. This particular catalytic reagent permits polymerization to occur at relatively low temperature, hence it minimizes formation of bubbles; it helps to minimize adhesion of the fully cured resin to the mold and therefore improves parting; and its use with styrene seems to require less time of curing in the mold.

The molecular weight and hence the physical and thermal properties of the polystyrene depend very strongly upon the amount of catalyst used. If as much as 1% of isopropyl percarbonate is used, the resulting sheet will be extremely brittle and will shatter almost as readily as glass. If ¼ of 1% catalyst is used, the resulting sheet is very tough and has properties very closely approaching that of commercially molded polystyrene. Using ¼ of 1% catalyst with the curing cycle described herein, the molecular weight of the polystyrene is probably around 120,000. I have found in practice that it is not advisable to go above ½ of 1% catalyst, in order to preserve the desirable physical properties of the sheet. Going much below ⅛ of 1% catalyst causes difficulty in curing, with formation of bubbles very likely to occur.

As to the temperature ranges given, in the low-heat stage it may be varied somewhat depending upon the thickness of the sheet being cured. For sheets of from 1/16" to ¼", the temperature of this stage can go to 55° C. In general, thicker sheets require lower temperatures here, while thinner sheets require higher temperatures. In this low-heat stage, if the heat goes above 55° C. the heat of polymerization is given off faster than it can be taken away by the oven, so that general temperature will rise to the boiling temperature of the styrene and bubbles will result. If this low-stage heating takes place at less than 35° C. the required time is excessive and what is worse, the styrene solidifies to become extremely viscous so that polymerization shrinkage occurs faster than the viscous material can flow so this shrinkage pulls voids (bubbles) in the sheet. In the middle-heat stage, if the temperature rises too high, the catalytic reagent is used up inefficiently because the higher temperature decomposes it and this prevents proper polymerization of the styrene.

As to the temperature to which the sheet is cooled after annealing, before the mold is opened, the area of the sheet has to be considered, because the larger the sheet, the greater is the overall shrinkage. A sheet of say 2' x 2' or less, can be opened at a much cooler temperature, even at 50° C., provided proper annealing has been given it. At 75° C. the resin is in a viscous fluid state, whereas at 71° C. it is in a solid state, so 73° C. has been picked as a safe middle temperature at which to open the mold. At any rate, the annealing stage is important because if cooled too rapidly, the strains of the shrinkage freeze themselves into the polystyrene unless several hours of annealing time are provided to give the strains time to relieve and equalize themselves, otherwise the sheet will craze. And this crazing effect will be increased, if the cooling takes place out of the oven.

A sheet cured with ¼% catalyst along the cycle described above, was found to have the following properties:

| Property | Results |
| --- | --- |
| Volatile, percent | 3.58 |
| Viscosity, cps | 19.5 |
| Impact strength: | |
| Notched, ft. lbs./in. of notch | 0.34 |
| Unnotched, ft. lbs./in. of width | 1.26 |
| Molecular weight (light scattering method) | 143,000 |

What is claimed is:

1. The process of producing craze and bubble free molded transparent sheets of polymerized styrene comprising the steps of adding a parting agent to styrene of watery thin consistency, thickening the mixture by boiling at a temperature of about 146° C. for a period of about 10 minutes, allowing the mixture to cool to room temperature, carrying out the heat polymerization of the thickened mixture by admixing therewith isopropyl percarbonate in the amount of from .125% to .5% by weight of the thickened mixture, placing the mixture in a sheet forming mold, curing the mixture in the mold by subjecting the mold to low, intermediate, and high temperature stages for preselected periods of time, where in the low temperature stage the mold is maintained at a temperature not exceeding 55° C. and not less than 35° C. depending on the thickness of the mixture in the mold, for 15 hours, where in the intermediate stage this mold is heated from the temperature of the first stage to a temperature of 80° C. over a period of 12 hours, and where in the high stage the mold is maintained at a temperature of 80° C. for about 6 hours, thereafter reducing the temperature of the mixture within the mold to an annealing temperature of 73° C. and maintaining said temperature for about 30 minutes and removing the mixture from the mold at a temperature of from 71° C. to 73° C.

2. The process of producing craze and bubble free molded transparent sheets of polymerized styrene comprising the steps of adding stearic acid to styrene of watery thin consistency, thickening the mixture by boiling at a temperature of about 146° C. for a period of about 10 minutes, allowing the mixture to cool to room temperature, carrying out the heat polymerization of the thickened mixture by admixing therewith isopropyl percarbonate in the amount of from .125% to .5% by weight of the thickened mixture, placing the mixture in a sheet forming mold, curing the mixture in the mold by subjecting the mold to low, intermediate, and high temperature stages for preselected periods of time, where in the low temperature stage the mold is maintained at a temperature not exceeding 55° C. and not less than 35° C. depending on the thickness of the mixture in the mold, for 15 hours, where in the intermediate stage this mold is heated from the temperature of the first stage to a temperature of 80° C. over a period of 12 hours, and where in the high stage the mold is maintained at a temperature of 80° C. for about 6 hours, thereafter reducing the temperature of the mixture within the mold to an annealing temperature of 73° C. and maintaining said temperature for about 30 minutes and removing the mixture from the mold at a temperature of from 71° C. to 73° C.

3. The process of producing craze and bubble free molded transparent sheets of polymerized styrene comprising the steps of adding a parting agent to styrene of watery thin consistency, thickening the mixture by boiling at a temperature of about 146° C. for a period of about 10 minutes, allowing the mixture to cool to room temperature, carrying out the heat polymerization of the thickened mixture by admixing therewith isopropyl percarbonate in the amount of from .125% to .5% by weight of the thickened mixture, placing the mixture in a sheet forming mold, curing the mixture in the mold by subjecting the mold to low, intermediate, and high temperature stages for preselected periods of time, where in the low temperature stage the mold is maintaind at a temperature not exceeding 55° C. and not less than 35° C. depending on the thickness of the mixture in the mold, for 15 hours, where in the intermediate stage this mold is heated from the temperature of the first stage to a temperature of 80° C. over a period of 12 hours, and where in the high stage the mold is maintained at a temperature of 80° C. for about 6 hours, thereafter reducing the temperature of the mixture within the mold to an annealing temperature of 73° C. and maintaining said temperature for about 30 minutes and removing the mixture from the mold at a temperature of from 71° C. to 73° C., and finally spray coating the sheets with a protective stripable flexible coating.

JOHN O. BEATTIE.

References Cited in the file of this patent
UNITED STATES PATENTS

| Number | Name | Date |
| --- | --- | --- |
| 2,256,160 | Britton et al. | Sept. 16, 1941 |
| 2,357,833 | Kropscott et al. | Sept. 12, 1944 |
| 2,385,486 | Bartoe et al. | Sept. 25, 1945 |
| 2,559,166 | Morner et al. | July 3, 1951 |